US006229303B1

United States Patent
Guzik

(10) Patent No.: US 6,229,303 B1
(45) Date of Patent: May 8, 2001

(54) SPINSTAND FOR TESTING MAGNETIC HEADS AND DISKS

(75) Inventor: Nahum Guzik, Palo Alto, CA (US)

(73) Assignee: Guzik Technical Enterprises, San Jose, CA (US)

( * ) Notice: Subject to any disclaimer, the term of this patent is extended or adjusted under 35 U.S.C. 154(b) by 0 days.

(21) Appl. No.: 09/044,473

(22) Filed: Mar. 19, 1998

(51) Int. Cl.$^7$ ..................................................... G01R 33/12
(52) U.S. Cl. ........................................ 324/212; 360/97.03
(58) Field of Search ................................... 324/210, 212, 324/262; 360/97.03–98.07; 369/272, 273

(56) References Cited

U.S. PATENT DOCUMENTS

| | | | |
|---|---|---|---|
| 4,660,110 | * 4/1987 | Iida et al. | 360/98 |
| 5,491,413 | * 2/1996 | Guzik | 324/212 |
| 5,539,592 | * 7/1996 | Banks et al. | 324/212 |
| 5,801,531 | * 9/1998 | Viches et al. | 324/212 |

* cited by examiner

*Primary Examiner*—Jay Patidar
(74) *Attorney, Agent, or Firm*—McDermott, Will & Emery

(57) ABSTRACT

A shroud of suitable shape is provided about the spindle and disk(s) of a spinstand. The shroud operates to reduce or eliminate air flow at the top and bottom surfaces of the disk(s) and limits the air volume moved by the rotating disk(s). The shroud also directs the air in a circular path around the spindle center. As a result, vortexes in the air surrounding the disks are significantly reduced, thereby decreasing the vibrations of the disk(s) and the heads and decreasing track misregistration. The shroud also reduces the heat exchange between the ambient air and the magnetic disk(s), which in turn reduces the thermal expansion of the disk(s) and thus decreases the track misregistration further. The shroud also provides electromagnetic shielding for the disk(s) and head(s) installed on the spinstand and thus increases the quality of the signal read from the magnetic disk(s). Since the shroud covers the rotating disk(s), it also reduces the risk of operator injury due to the magnetic disk(s) breaking or becoming detached from the spindle, and it reduces the risk of accidental contact of the operator with the heads and disks, thus decreasing the chance of contamination. The shroud can be fitted with an optional shutter which can be used to protect the disks against contamination. Forced air can be utilized in order to control the temperature of the air inside the shroud and to remove dust and other particles from inside the shroud with the help of ionized air.

10 Claims, 7 Drawing Sheets

SPINSTAND FOR TESTING MAGNETIC HEADS AND DISKS

FIELD OF THE INVENTION

The present invention relates to spinstands, in particular, to an apparatus for stabilizing the airflow near and around the disks mounted on and spun by the spindle of a spinstand.

BACKGROUND OF THE INVENTION

A magnetic head and disk tester is an instrument that is used for testing the characteristics of magnetic heads and disks such as a signal-to-noise ratio, track profile, etc. The tester should simulate those motions of the head with respect to the disk and the same rotational speeds of the disks that occur in an actual hard disk drive during operation. Each tester consists of two components, i.e., a mechanical component, commonly referred to as a spinstand, that performs movements of the head with respect to the disk, and an electronic component that is responsible for measurement, calculation, and analysis of the measured signal. The spinstand is also a mechanical component of a servo-writer, an instrument that is used for writing servo information on a magnetic disk, as well as a component of a flying height tester; an instrument used for measuring the flying height of a head over the disk.

A typical prior art spinstand for a head and disk tester is illustrated in FIG. 1 (front view) and FIG. 2 (top view). The spinstand includes a stationary base plate 10 that supports walls 12a, 12b, 12c. The walls 12a, 12b, 12c in turn support a spindle 13 for carrying a disk pack DP disposed in a cylindrical disk pack region including one or more magnetic disks 14 having diameter D and having arranged in parallel, and b being coaxial about a disk pack axis DPA. The spindle 13 and disks 14 are rotated by a spindle motor 15 about a spin axis.

The base plate 10 further supports first and second slide motors (not shown). The first slide motor moves a slide 16 along rails 17a, 17b in the Y direction (see FIG. 2). Two additional rails, 18a, 18b, are mounted on top of slide 16. The second slide motor controls movement of a second slide 19 along rails 18a, 18b in the X direction. The first and second motors cooperate to position a rotary positioner 20 mounted on slide 19 to a specified location with respect to the center of spindle 13. Rotary positioner 20 carries and positions magnetic head(s) 22 relative to disk(s) 14.

As the density of magnetic recording increases, additional information tracks are compressed into a given disk area. The decrease in track size heightens the demand for improved accuracy in head positioning. Likewise, the rotational speeds of the magnetic disks increase in order to achieve shorter access times. In addition, more disks are added to the disk stack to provide additional storage.

As the disk(s) rotate they cause the air around them to circulate, which creates a region of low pressure surrounding the disk(s). Due to this low pressure, air is drawn in from the top and bottom surfaces of the disk(s) and is moved outward from the spindle center. The air flow generates vortexes that induce vibrations in both the disks and the magnetic heads. These vibrations increase track misregistration. As the rotational speeds increase, vortexes generated by the rotating disk(s) increase significantly, and the vibrations and track misregistration reach unacceptable levels. Track misregistration is further exacerbated due to the change of the ambient temperature, which results in the expansion, or contraction of the magnetic disk. Furthermore, with more disks in the stack, the stack has a higher propensity to vibrate, causing further track misregistration. In some cases, track misregistration reaches unacceptable levels at which spinstand operation becomes unreliable.

Electromagnetic shielding is a further important consideration because electromagnetic radiation in the air tends to increase the noise level and degrade the quality of the signal read from the magnetic disk.

In spinstands, there is a danger of the magnetic disk(s) breaking or becoming detached from the spindle, due to mechanical defects in the material of the disk(s) and/or a failure of the clamping mechanism that is used to hold the magnetic disk(s) on the spindle. With increasing rotational speeds of the magnetic disks, this danger and the risk of injury to the operator of the spinstand increases.

Spinstands are usually operated in clean room environments as it is necessary to protect the magnetic disks and the heads from contamination. The contamination can occur due to dust particles in the air, or by accidental contact of the operator with the heads and disks.

SUMMARY OF THE INVENTION

The present invention is directed to an apparatus and method which mitigates the aforementioned prior art limitations.

It is an object of the present invention to provide a spinstand that significantly decreases the track misregistration due to vibrations caused by vortexes generated by the rotating disks, by stabilizing the airflow around the disk(s) and the spindle, and by reducing the heat exchange between the ambient air and the magnetic disk(s).

Another object of the invention is to provide the aforementioned spinstand that increases the quality of the signal read from the magnetic disk(s) by providing electromagnetic shielding for the disk(s) and head(s) installed on the spinstand.

Another object of the invention is to provide the aforementioned spinstand that substantially reduces the risk of operator injury due to the magnetic disk(s) breaking or becoming detached from the spindle.

Still another object of the invention is to provide the aforementioned spinstand that reduces the risk of accidental contact of the operator with the heads and disks, thus decreasing the chance of contamination.

More specifically, the invention employs a shroud which substantially encompasses the spindle and the disk(s) of the spinstand. This shroud reduces and/or eliminates the air flow drawn toward the top and the bottom surfaces of the disk(s), and limits the total air volume that is moved by the rotating disk(s). Air flow is directed in a circular path around the spindle center. As a result, vortexes in the air surrounding the disks are significantly reduced, thereby decreasing the vibrations of the disk(s) and heads, and decreasing track misregistration. The shroud further reduces the heat exchange between the ambient air and the magnetic disk(s), which reduces thermal expansion of the disk(s) and thus further decreases track misregistration.

The shroud also provides electromagnetic shielding for the disk(s) and head(s) installed on the spinstand and thus increases the quality of the signal read from the magnetic disk(s).

Since the shroud covers the rotating disk(s), it further offers the advantage of a reduction of the risk of operator injury due to the magnetic disk(s) breaking or becoming detached from the spindle, and further reduces the risk of accidental contact of the operator with the heads and disks, thus decreasing the chance of contamination.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
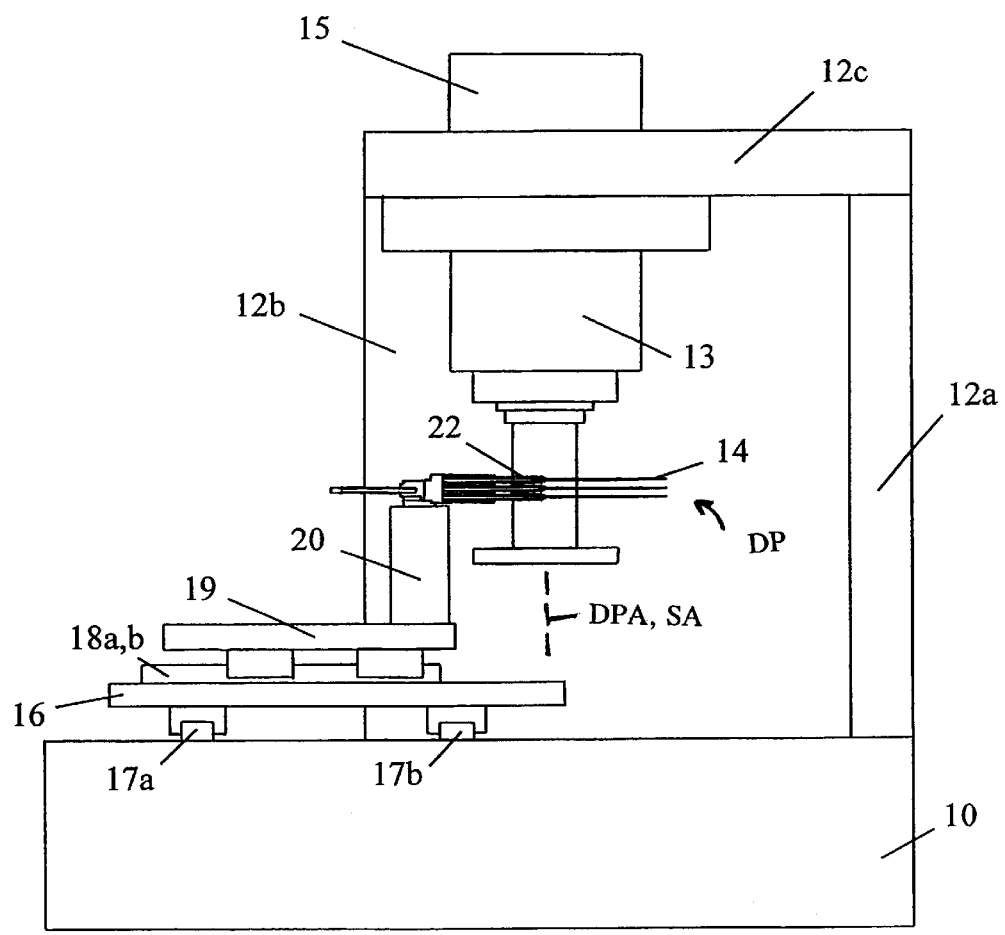
FIG. 1 is a schematic front view of a prior art spinstand.
Figure 2:
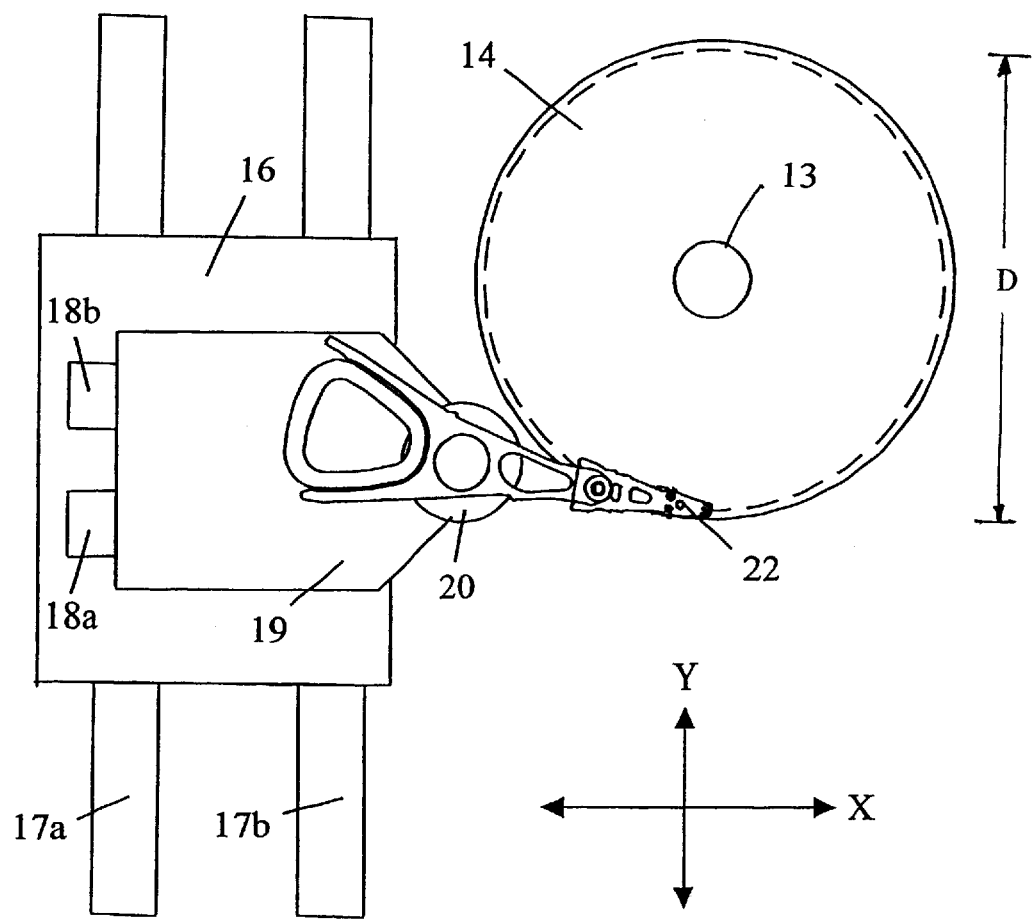
FIG. 2 is a schematic top view of the spinstand in FIG. 1.
Figure 3:
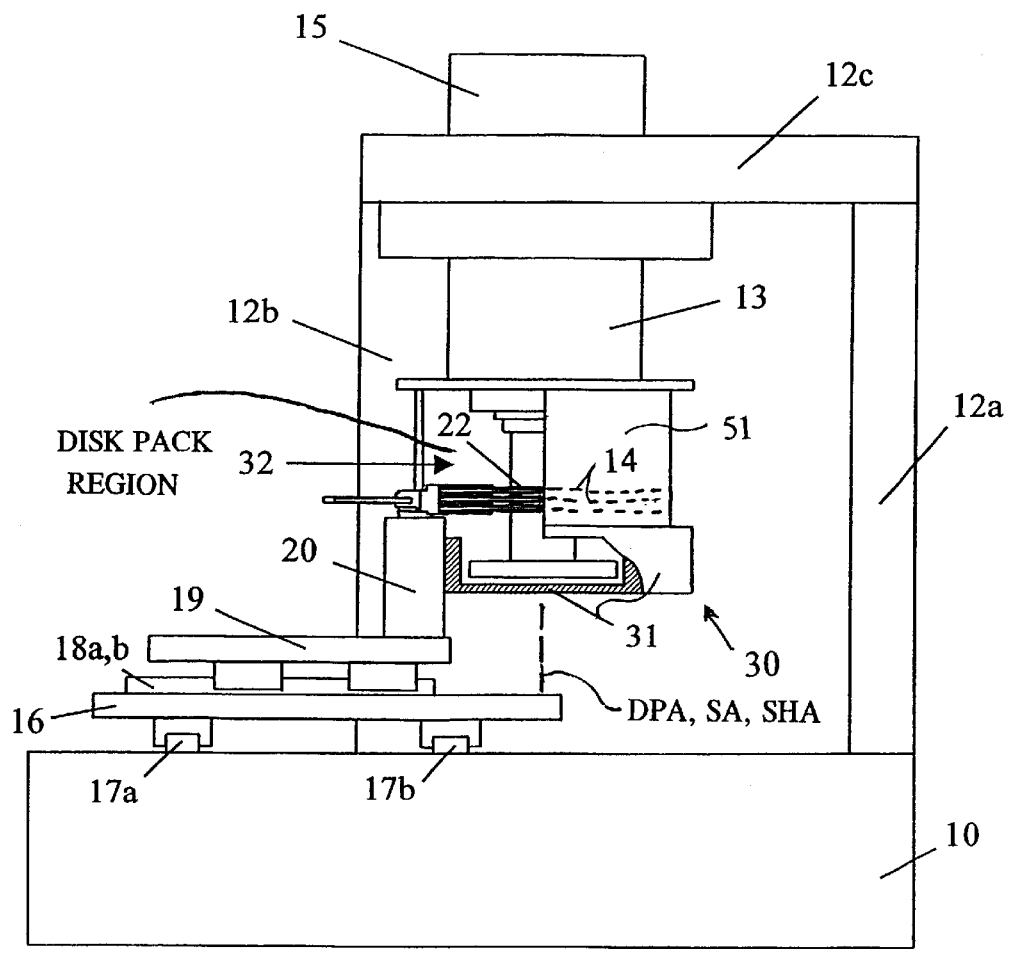
FIG. 3 is a schematic front view of a spinstand, including a shroud in accordance with the present invention.
Figure 4:
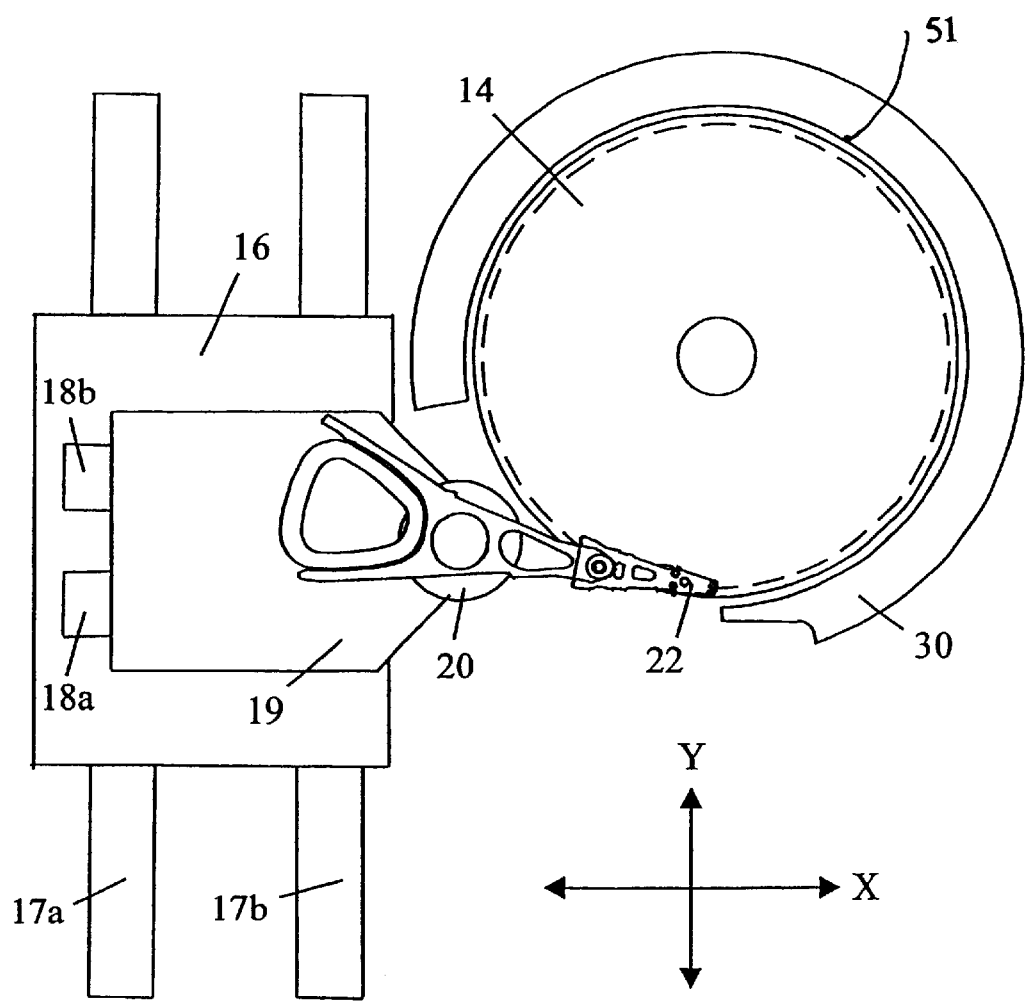
FIG. 4 is a schematic top view of the spinstand in FIG. 3.
Figure 5:
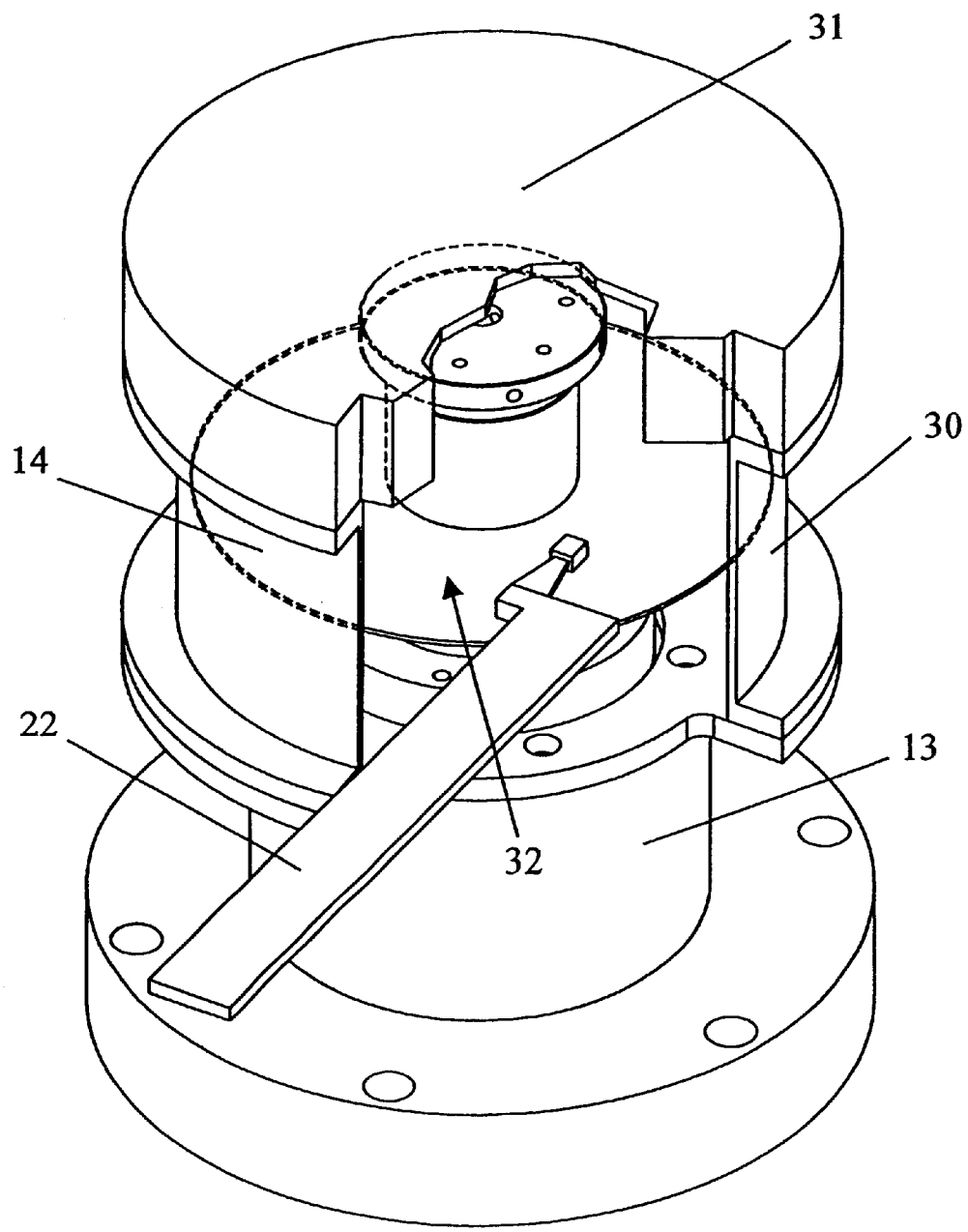
FIG. 5 is a perspective view of the shroud of the present invention.

As illustrated in the side view of FIG. 3 and the top view of FIG. 4 the spinstand of the present invention includes a shroud 30 define as cylindrical inner wall of diameter slightly larger than D, to rigidly attached to a stationary part of spindle 13 disposed about the disk pack region. Shroud 30 is generally of a cylindrical shape extending along a shroud axis SHA (coaxial with spin axis SA) to cover the disk(s) 14 of the spinstand. The side walls 51 of shroud 30 match closely with the edges of the disk(s) 14 to reduce the volume of air within the shroud 30. An end cap 31 of the shroud 30 covers the undersurface of disk(s) 14. The shroud is shown in perspective view in FIG. 5.

Figure 6:
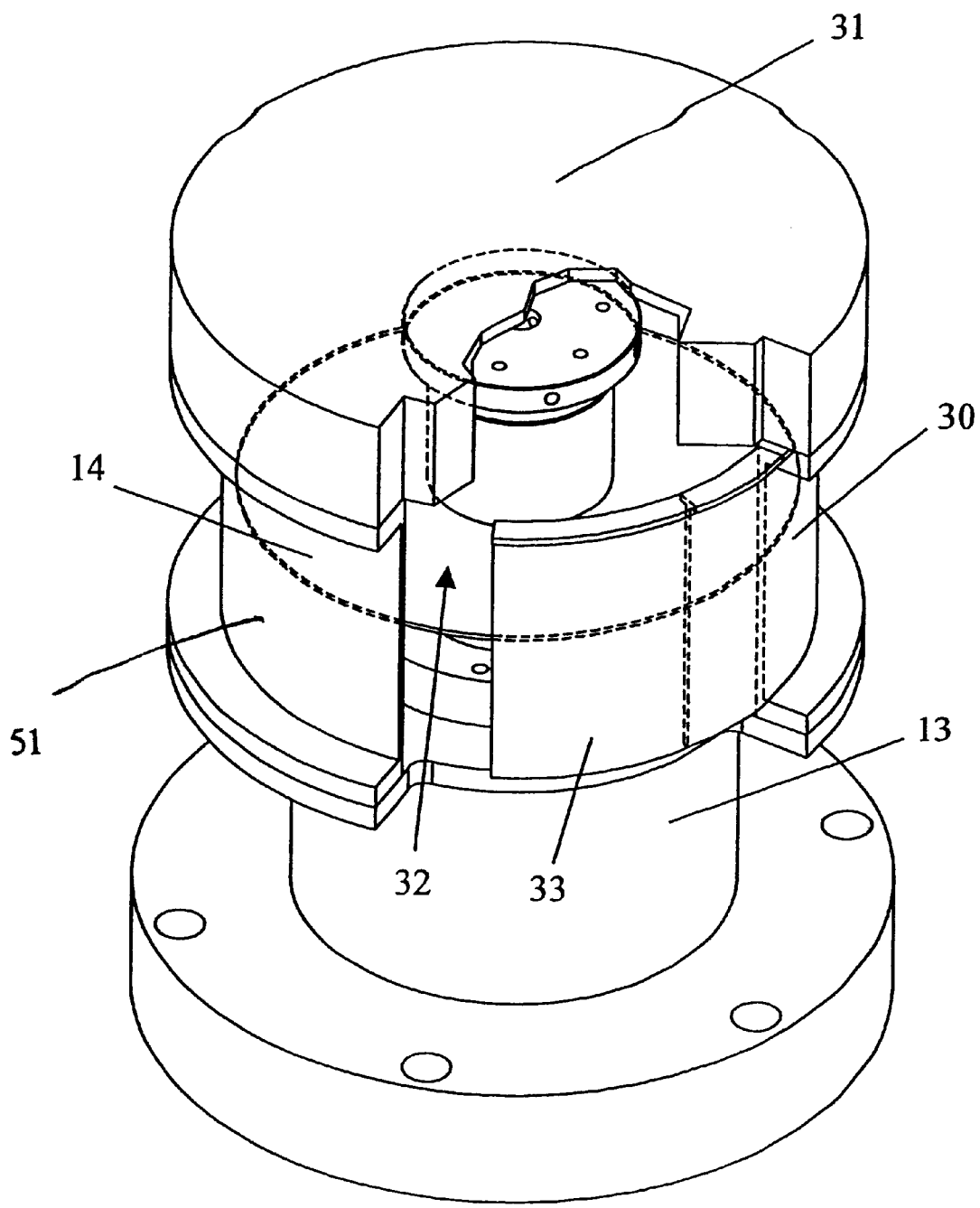
FIG. 6 is a perspective view of an alternative embodiment of the shroud of the present invention, including an optional shutter.

In a preferred embodiment, shroud 30 includes an opening 32 to allow for access to the disk(s) by head(s) 22. A shutter 33 as shown in FIG. 6 may optionally be included to close opening 32 when the heads are not positioned over disk(s) 14 or when the spinstand is not in use, thus protecting disk(s) 14 against contamination. The shutter 33 can be motorized such that the opening 32 can be modified automatically. Shroud 30 can be manufactured from a plastic, aluminum, or alloy material, optionally in a transparent material such that the operator can view the operation of the magnetic head(s) 22 when they are positioned over disk(s) 14.

Because the shroud 30 covers the top and bottom sides of disk(s) 14, no air is drawn in toward the top or bottom of the disk(s) 14. In addition, the volume of the air circulating around the disk(s) 14 is decreased significantly. As a result, vortexes in the air surrounding the disks are substantially reduced, which decreases vibrations in both the disk(s) 14 and the magnetic head(s) 22 and decreases the frequency of track misregistration. The shroud 30 also reduces the heat exchange between the ambient air and magnetic disk(s) 14, which in turn reduces the thermal expansion of disk(s) 14 and thus further decreases track misregistration.

Where suitable materials are used for shroud fabrication, the shroud 30 can further provide electromagnetic shielding for disk(s) 14 and head(s) 22 installed on the spinstand and thus protects the signal from the noise created by the electromagnetic radiation in the air. This increases the quality of the signal read from magnetic disk(s) 14.

Since the shroud covers rotating disk(s) 14, it also reduces the risk of operator injury due to magnetic disk(s) 14 breaking or becoming detached from spindle 13 and it reduces the risk of accidental contact of the operator with head(s) 22 and disk(s) 14, thus decreasing the possibility of contamination.

Figure 7:
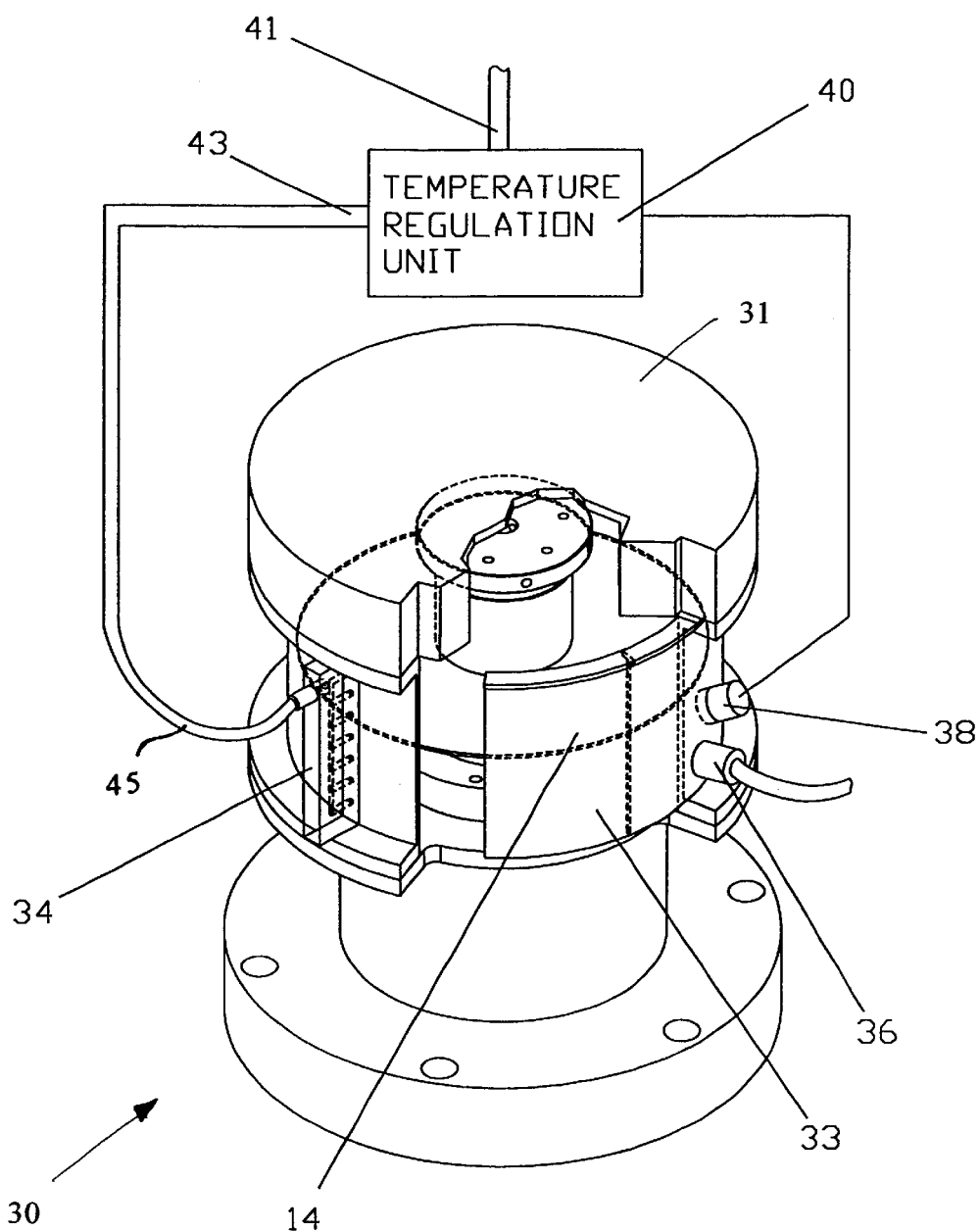
FIG. 7 is a perspective view of an alternative embodiment of the shroud of the present invention, including an optional temperature sensor and a temperature control unit.

FIG. 7 shows an alternative embodiment of the present invention wherein the shroud 30 is provided with an air inlet manifold 34 through which ionized air 45 is forced into the shroud 30. An air outlet 36 is also provided to allow for outflow of air when shutter 33 is closed. The constant flow of ionized air 45 maintains a clean environment for the disk(s) 14 and head(s) 22 by removing and/or eliminating dust particles.

Temperature sensor 38 monitors the temperature of the air inside the shroud 30. Temperature information is fed back to a temperature regulation unit 40, which includes an air inlet 41 and an air outlet 43. The temperature regulation unit 40 controls the temperature of air forced into the shroud in order to maintain a suitable temperature level. As a result, thermal expansion of the disk(s) 14 is substantially eliminated and track misregistration is further reduced.

The invention therefore provides an apparatus that stabilizes airflow in spinstands, decreases track misregistration and increases the quality of the signal read from magnetic disk(s) 14. In addition, this apparatus protects a spinstand operator from potential injuries that could be caused by magnetic disk(s) 14 breaking or becoming detached from the spindle. The apparatus of the invention decreases the chances of contamination by reducing the risk of accidental contact of the operator with head(s) 22 and disk(s) 14 and also by removing dust particles with the help of forced ionized air.

While this invention has been particularly shown and described with references to preferred embodiments thereof, it will be understood by those skilled in the art that various changes in form and details may be made therein without departing from the spirit and scope of the invention as defined by the appended claims.

For example, the aforementioned apparatus can be designed of two separate parts—a shrouding cylinder 51 and a cap 31—to make the apparatus easy to manufacture. It is well suited for use on a spinstand for performing head testing, disk testing or servo writing, or any combination of these functions. Various types of positioning mechanisms, such as linear, rotary, one or multi dimensional, etc. can be used to position head(s) 22 on disk(s) 14. Various driving means such as stepper motors, linear servo motors, rotary servo motors, voice coil motors, etc. can be employed to drive these positioning mechanisms.

I claim:

1. A spinstand for testing magnetic heads and magnetic disks in a disk pack, said disk pack including a stack of two or more magnetic disks in respective parallel disk planes with said disks being coaxial and spaced apart along a disk pack axis, said disks having an outer diameter D, comprising A. a base assembly, B. a disk pack support assembly mounted to said base assembly and including means for rotationally supporting said disk pack in a cylindrical disk pack region disposed about a spin axis and having a diameter D, with said spin axis being coaxial with said disk pack axis, C. a magnetic head assembly mounted to said base assembly and including a support for adjustably positioning at least one magnetic head in a plane parallel to said disk planes and adjacent to one of said disks, D. a shroud having a sidewall disposed along a shroud axis and said sidewall having a cylindrical shaped inner surface extending along said shroud axis and having a diameter slightly greater than D, wherein said sidewall of said shroud includes an axially extending aperture, and wherein said shroud includes a shutter adjacent to said sidewall for selectively opening and closing said aperture, E. a shroud support for coupling said shroud to said base assembly with said shroud axis coaxial with said spin axis and said inner cylindrical surface of said sidewall disposed about said cylindrical disk pack region.

2. The spinstand of claim 1 further comprising means for engaging said shutter between open and closed positions.

3. The spinstand of claim 1 wherein portions of said shroud are formed of transparent material.

4. The spinstand of claim 1 wherein said shroud includes an inlet through which gas is supplied to the cylindrical disk pack region.

5. The spinstand of claim 4 wherein said shroud further includes an outlet from which supplied gas escapes the cylindrical disk pack region.

6. The spinstand of claim 4 further comprising a temperature sensor and temperature controller for monitoring the temperature of gas in said cylindrical disk pack region inside the shroud and for maintaining the temperature at a desired level.

7. The spinstand of claim 6 wherein said temperature controller further adjusts the temperature of the gas supplied to said gas inlet of the shroud.

8. The spinstand of claim 4 wherein said supplied gas comprises ionized gas.

9. The spinstand of claim 1 wherein said shroud is formed of an electromagnetic shielding material.

10. The spinstand of claim 1 wherein a disk pack is mounted to the spindle.

\* \* \* \* \*